(12) United States Patent
Taniguchi et al.

(10) Patent No.: US 10,187,182 B2
(45) Date of Patent: Jan. 22, 2019

(54) INTEGRATED CIRCUIT, RADIO COMMUNICATION APPARATUS, AND METHOD

(71) Applicant: KABUSHIKI KAISHA TOSHIBA, Minato-ku, Tokyo (JP)

(72) Inventors: Kentaro Taniguchi, Kanagawa (JP); Tsuguhide Aoki, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 51 days.

(21) Appl. No.: 15/393,378

(22) Filed: Dec. 29, 2016

(65) Prior Publication Data

US 2017/0257188 A1 Sep. 7, 2017

(30) Foreign Application Priority Data

Mar. 2, 2016 (JP) .................................. 2016-039825

(51) Int. Cl.
*H04L 1/08* (2006.01)
*H04L 1/18* (2006.01)
*H04L 1/00* (2006.01)

(52) U.S. Cl.
CPC ................ *H04L 1/08* (2013.01); *H04L 1/005* (2013.01); *H04L 1/0045* (2013.01); *H04L 1/0054* (2013.01); *H04L 1/0055* (2013.01); *H04L 1/0061* (2013.01); *H04L 1/1864* (2013.01)

(58) Field of Classification Search
CPC ....... H04L 1/08; H04L 1/1864; H04L 1/0045; H04L 1/0054; H04L 1/0055
See application file for complete search history.

(56) References Cited

U.S. PATENT DOCUMENTS

| 2007/0149242 | A1* | 6/2007 | Kim ....................... H04J 11/004 455/525 |
| 2009/0028100 | A1* | 1/2009 | Mukkavilli ........... H04L 5/0007 370/329 |
| 2010/0180173 | A1* | 7/2010 | Batra .................... H04L 1/1812 714/751 |
| 2017/0300389 | A1* | 10/2017 | Natarahjan ......... G06F 11/1464 |

FOREIGN PATENT DOCUMENTS

WO WO-2015/094257 A1 6/2015

\* cited by examiner

*Primary Examiner* — Joseph D Torres
(74) *Attorney, Agent, or Firm* — Foley & Lardner LLP

(57) ABSTRACT

According to one embodiment, an integrated circuit receives first packet scrambled with a first scrambling seed and second packet scrambled with a second scrambling seed, generates inversion data, generate third likelihood information by inverting signs of the first likelihood information or the second likelihood information based on the inversion data, and generates fourth likelihood information based on the third likelihood information and the second or first likelihood information.

20 Claims, 13 Drawing Sheets

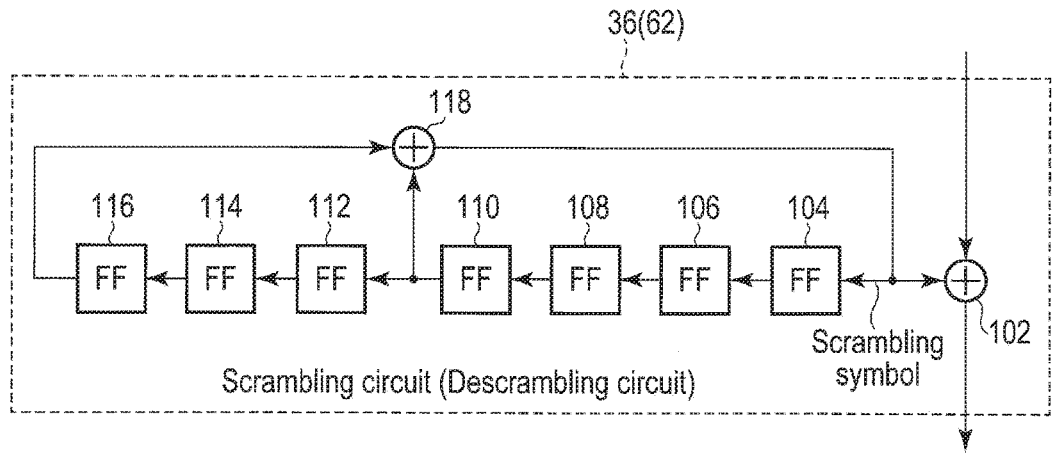
F I G. 3
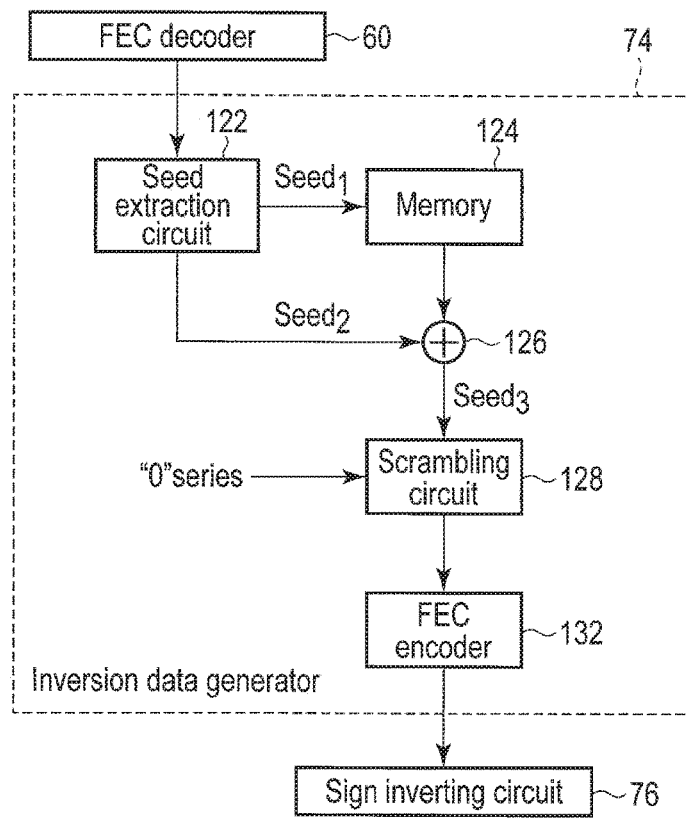
F I G. 4

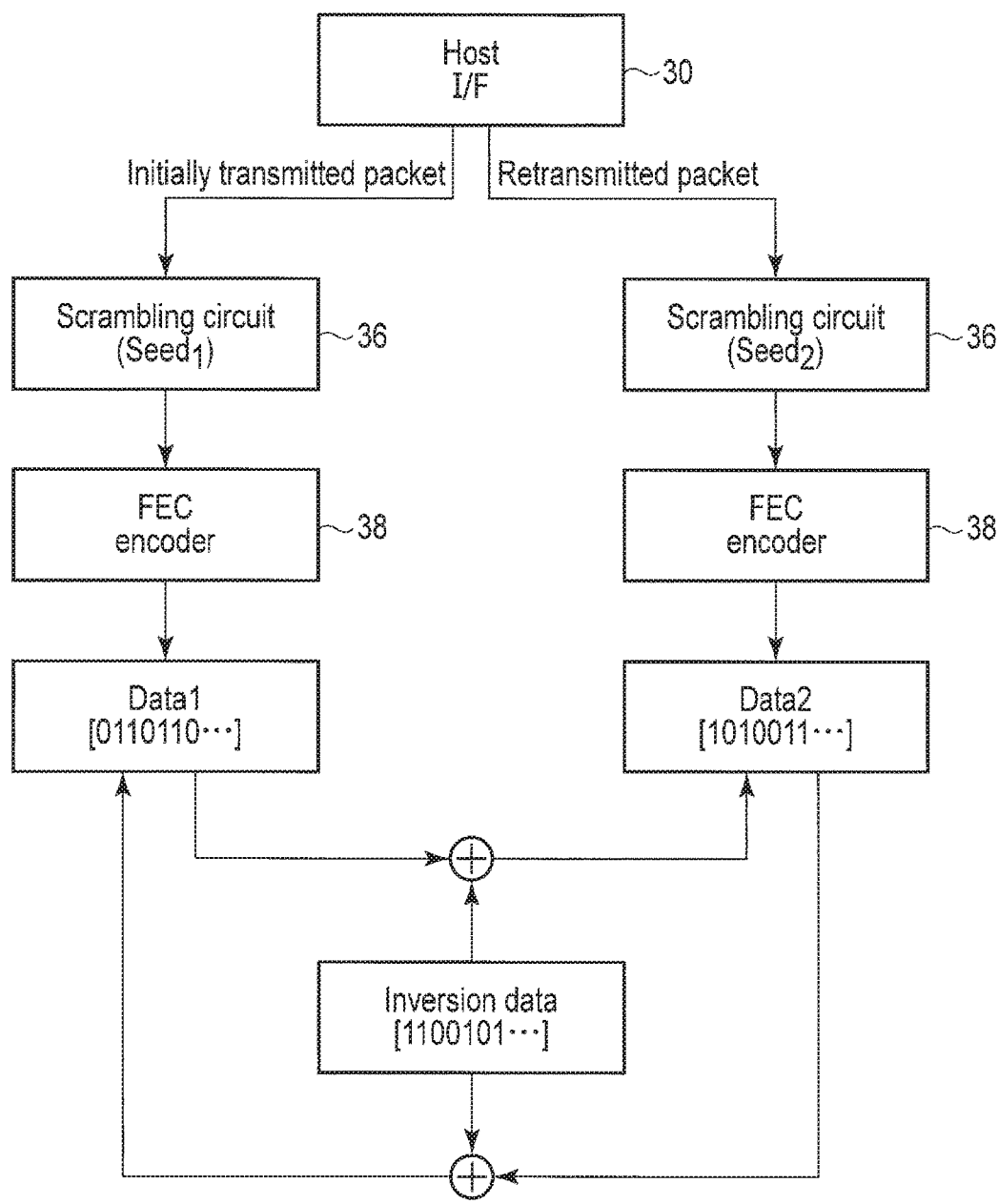
F I G. 5

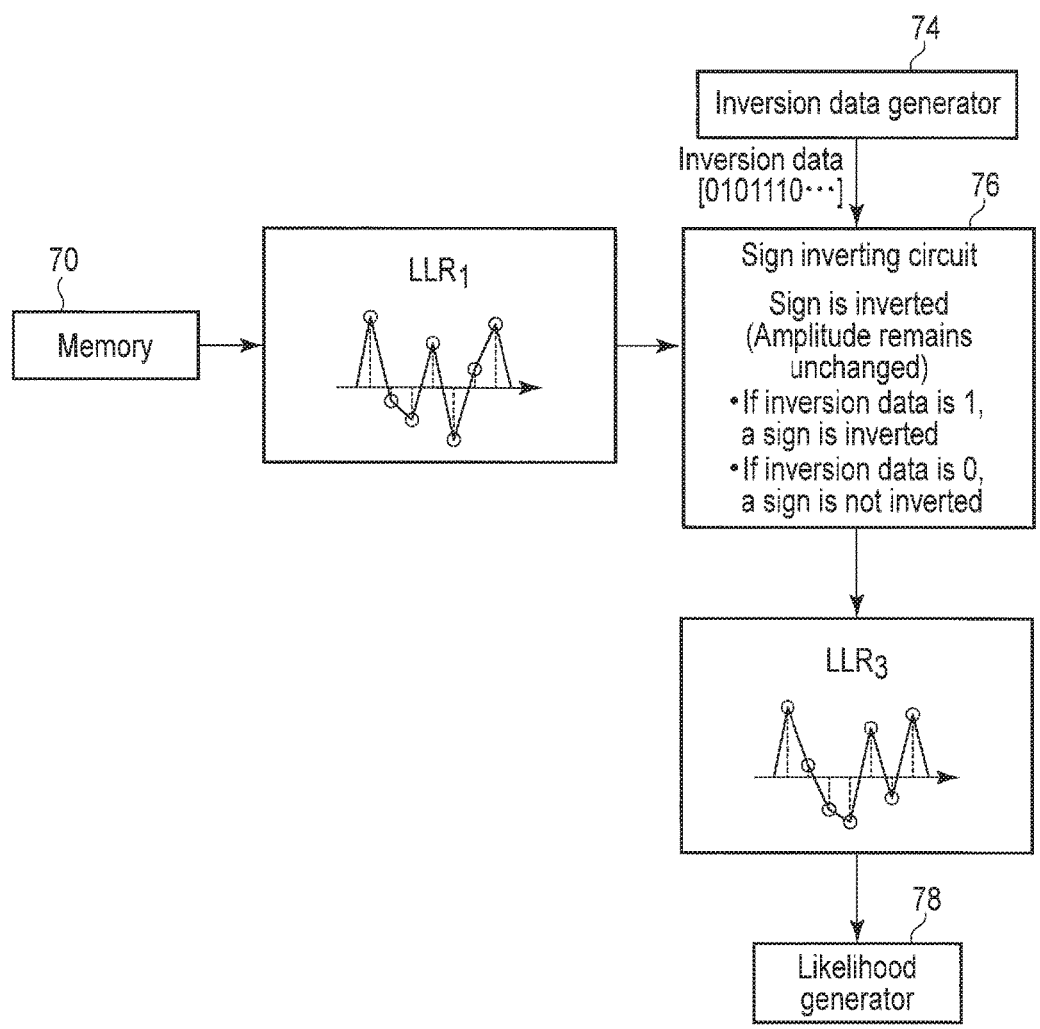
F I G. 6

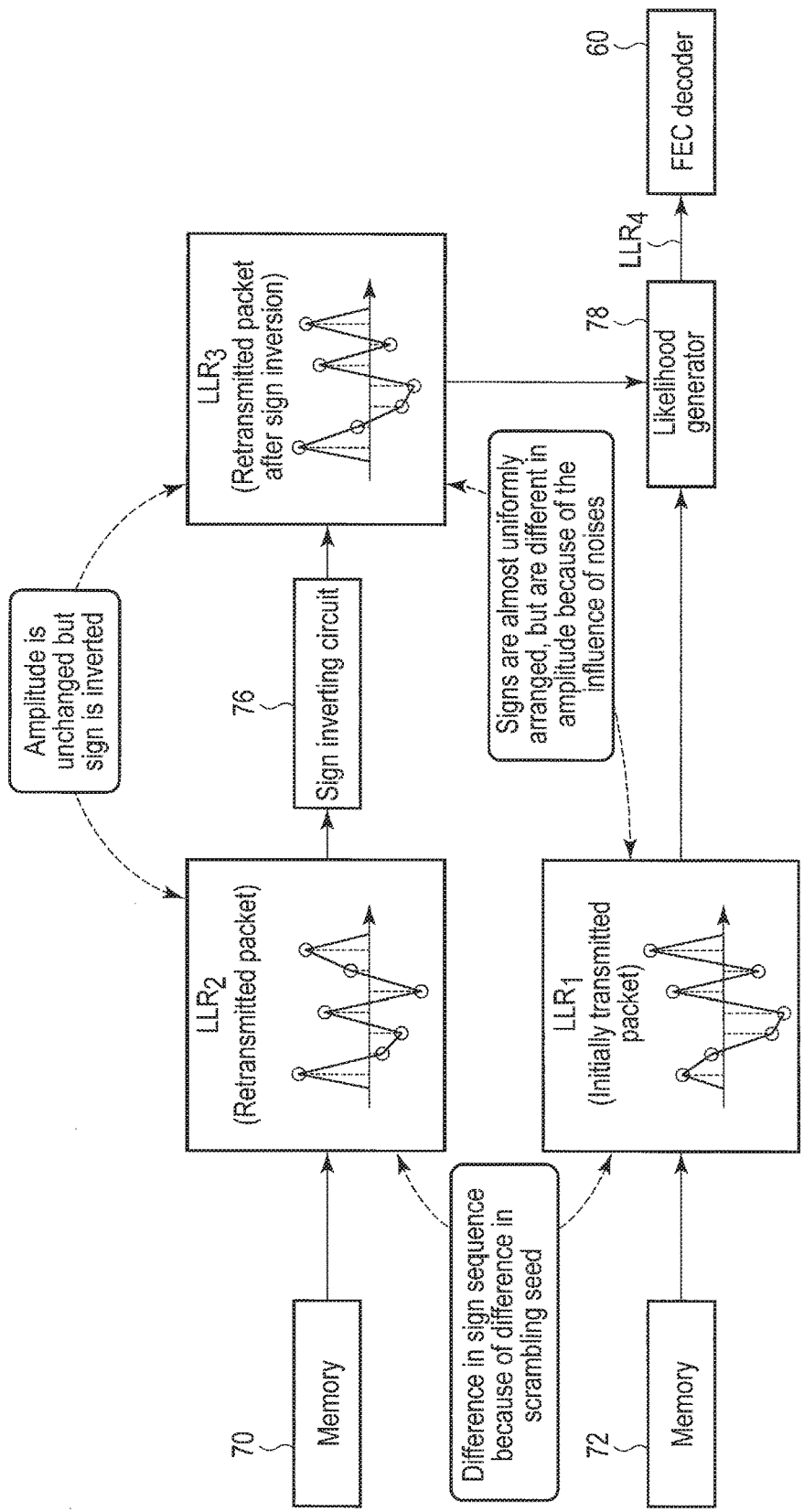
F I G. 8

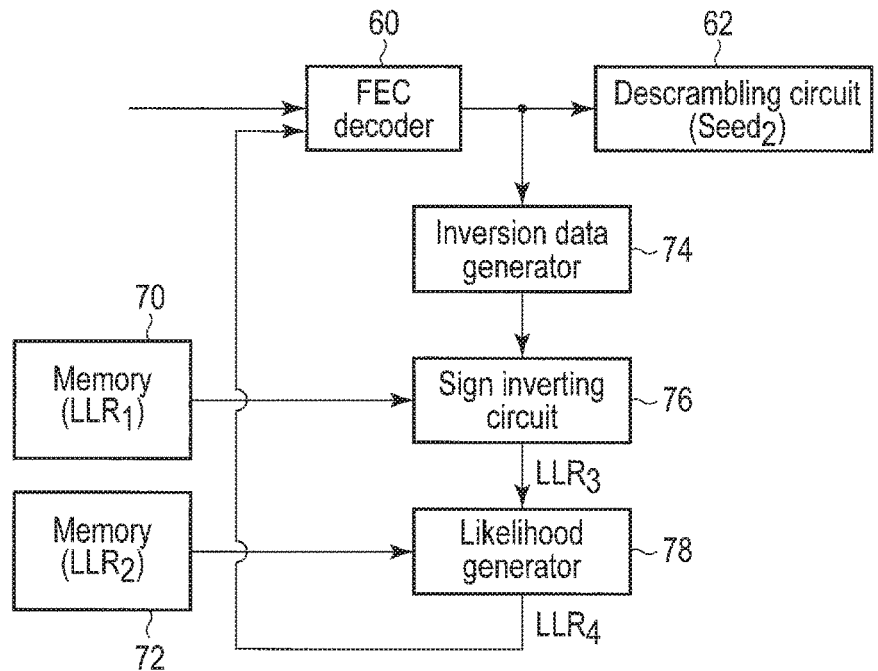
F I G. 9A
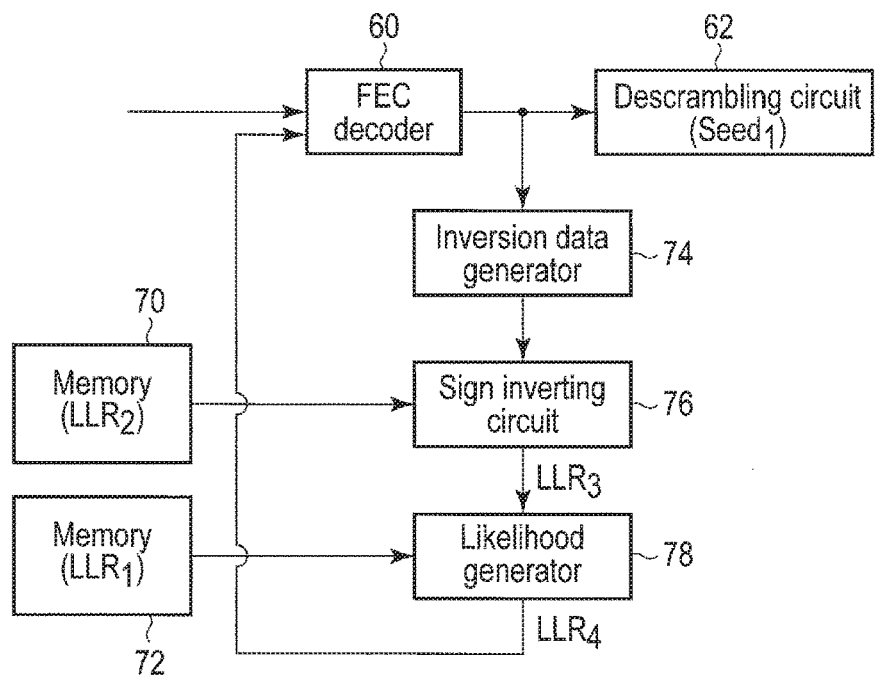
F I G. 9B

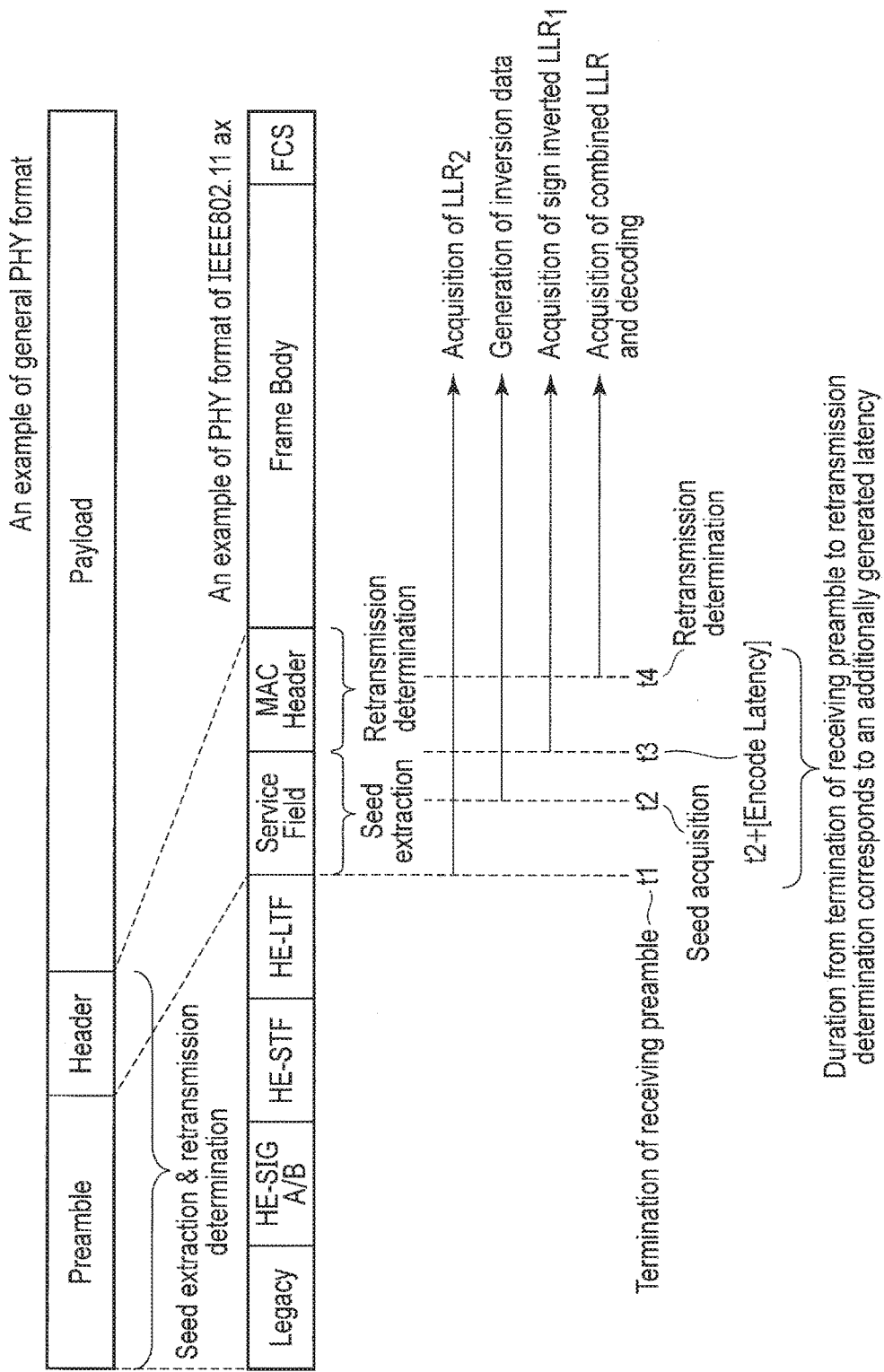
F I G. 10

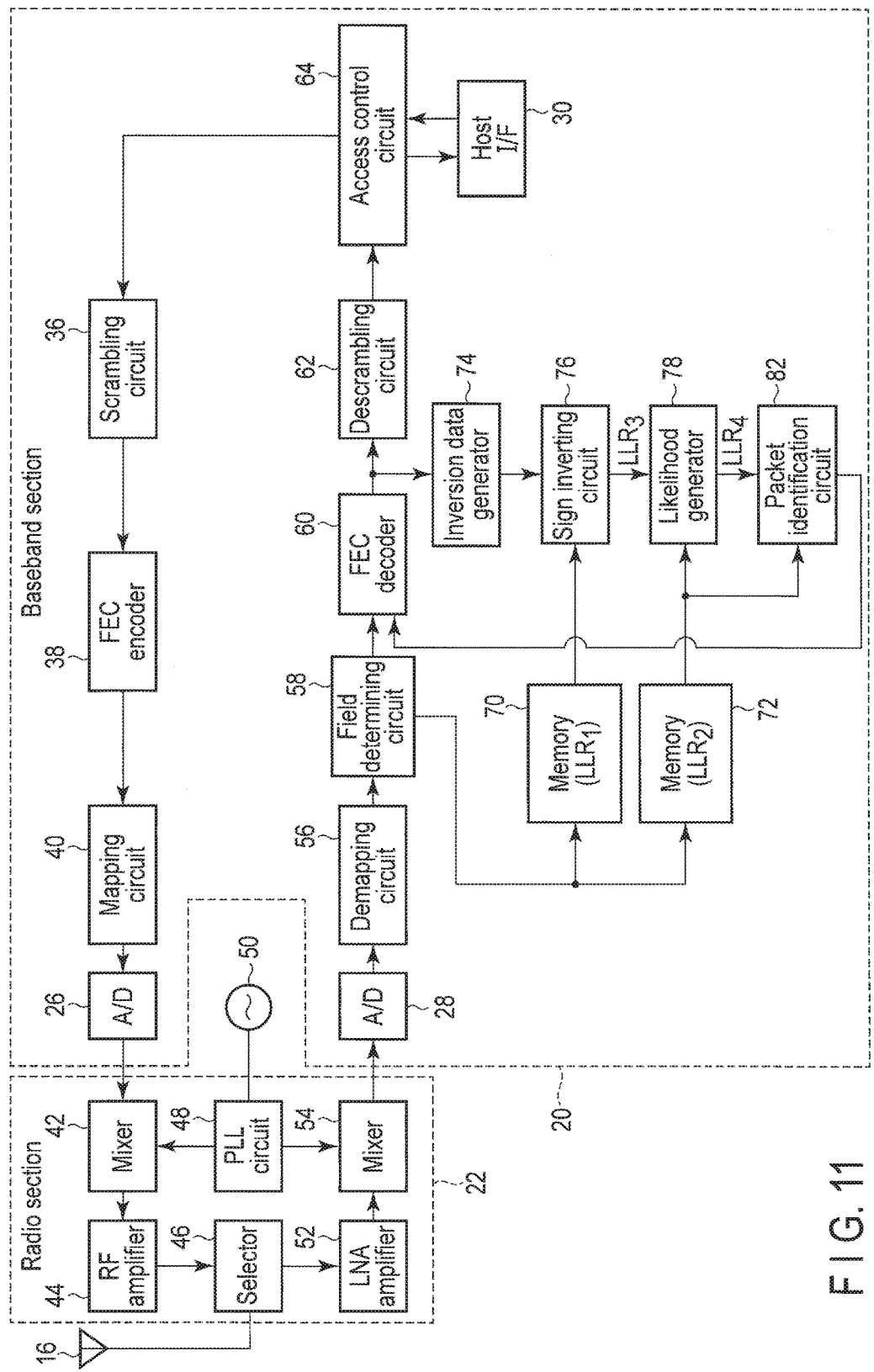
F I G. 11

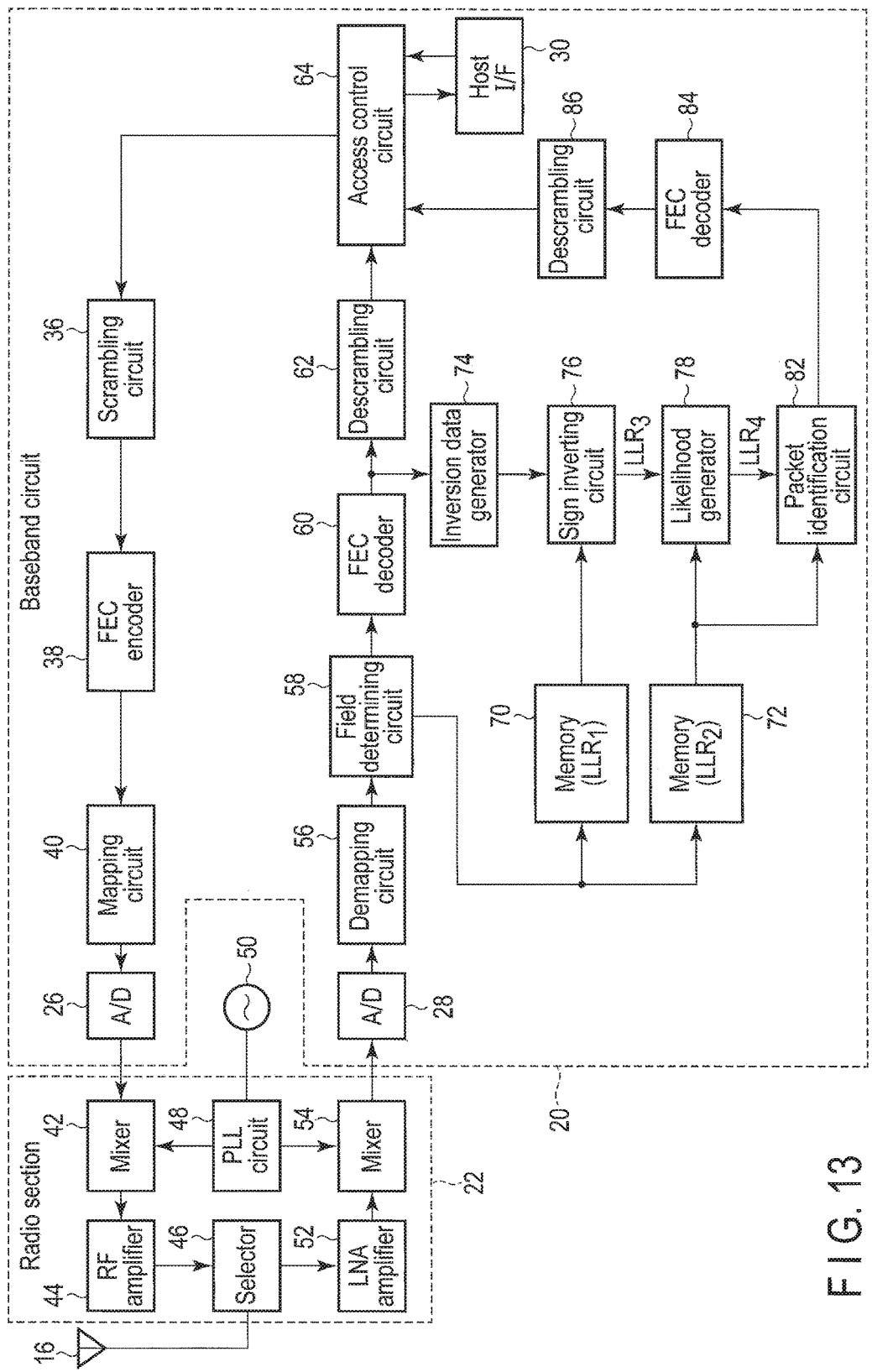
F I G. 13

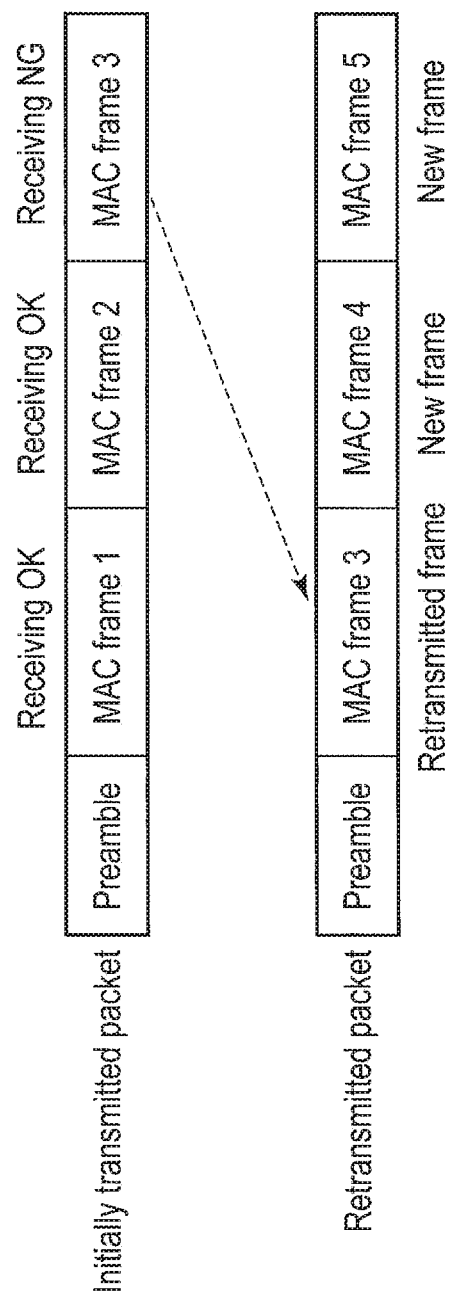
F I G. 14

INTEGRATED CIRCUIT, RADIO COMMUNICATION APPARATUS, AND METHOD

CROSS-REFERENCE TO RELATED APPLICATIONS

This application is based upon and claims the benefit of priority from Japanese Patent Application No. 2016-039825, filed Mar. 2, 2016, the entire contents of which are incorporated herein by reference.

FIELD

Embodiments described herein relate generally to an integrated circuit, a radio communication apparatus, and a method, each of which uses Automatic Repeat reQuest (ARQ).

BACKGROUND

Radio packet communication uses Automatic Repeat reQuest for improvement in band use efficiency. In Automatic Repeat reQuest, if the result of decoding a received packet includes an error, the same data will be retransmitted. Since the same data is retransmitted, a receiver, which executes decoding with the use of Log Likelihood Ratio (LLR, which will be hereafter referred to as "likelihood information") of a received packet, can improve a received signal in quality by combining the likelihood information of the initially transmitted packet with the likelihood information of a retransmitted packet.

On the other hand, a radio transmitter successively subjects transmitted data to a scrambling process and a pseudo-randomizing process, and then encodes the resultant data in many cases in order to make a signal smooth in spectrum and time waveform, or in order to make small interference to other systems. In the scrambling process, a portion of data in a single packet will be subjected to a replacement (or sign inversion) operation, in which "0's" are replaced with "1's" and "1's" are replaced with "0's". The replacement of "0's" and "1's" is controlled by a scrambling code generated by a scrambling circuit, and the scrambling code is determined by a scrambling seed. The receiver has a descrambling circuit, which is the same in structure as the scrambling circuit of the transmitter, and subjects the decoded data to a descrambling process, thereby obtaining the original transmitted data. In some communication systems, however, a scrambling seed may change at the time of retransmission, and may be different from what it was at the time of initial transmission. Then, even if the retransmitted data is the same as the initial transmitted data, positions where "0's" and "1's" are replaced with the respective counter digits "1's" and "0's" will be different since the scrambling seed used at the time of retransmission is different from what it was at the time of initial transmission. As a result, the transmitted data and the retransmitted data will be received as a completely different data stream, so that the received data cannot be improved in quality even if likelihood information combination is executed.

With a view to solving the above problem, there is conventionally proposed a technique, in which a received signal is improved in quality with the use of likelihood information combination even if a scrambling seed has changed at the time of retransmission. When the initially transmitted packet is received in the conventionally proposed technique, a decoding process and a descrambling process are successively executed with the use of soft values (sign and amplitude), and a result (a soft value) obtained by the descrambling process is stored in a memory. When a retransmitted packet is received, the stored result of the descrambling process is subjected to a scrambling process with the use of the same scrambling seed as the retransmitted packet, and the scrambled result is coded. The scrambling process and the coding process are performed with the use of soft values. The coding result (the obtained soft value) is equivalent to the likelihood information of a packet which is transmitted after the initially transmitted data has been subjected to the scrambling process with the use of the same scrambling seed as the retransmitted packet. Therefore, if the coding result is combined with the likelihood information of the retransmitted packet, the reliability of the received signal will be improved.

The conventional receiver uses soft values when executing each of decoding, descrambling, scrambling, and coding, so that circuit structure and power consumption will be large. In a general radio communication device, an input to a decoder and an input/output of a descrambling circuit are binary data. Therefore, the conventional technique additionally requires an exclusive decoder and an exclusive descrambling circuit, each being exclusively used for processing soft values in order to achieve combination of likelihood information.

BRIEF DESCRIPTION OF THE DRAWINGS

FIG. 3 is an exemplary block diagram illustrating a detailed structure of a scrambling circuit 36 or a descrambling circuit 62 of FIG. 2.

FIG. 4 is an exemplary block diagram illustrating a detailed structure of an inversion data generator 74 of FIG. 2.

FIG. 5 exemplarily illustrates a principle of a sign inverting circuit 76 of FIG. 2.

FIG. 6 exemplarily illustrates an operation of the sign inverting circuit 76 of FIG. 2.

FIG. 8 exemplarily illustrates another operation of the likelihood generator 78 of FIG. 2.

FIG. 9A exemplarily explains a setting operation of a scrambling seed for the descrambling circuit 62 of FIG. 2.

FIG. 9B exemplarily explains another setting operation of a scrambling seed for the descrambling circuit 62 of FIG. 2.

FIG. 10 illustrates an exemplary packet format in the embodiment.

FIG. 11 is an exemplary block diagram illustrating a detailed structure of a wireless LAN module according to a second embodiment.

FIG. 13 is an exemplary block diagram illustrating a detailed structure of a wireless LAN module according to a third embodiment.

FIG. 14 illustrates an exemplary frame aggregation.

DETAILED DESCRIPTION

In general, according to one embodiment, an integrated circuit includes a baseband integrated circuit. The baseband integrated circuit is configured to receive first packet data scrambled with a first scrambling seed and second packet data scrambled with a second scrambling seed; cause a memory to store at least one of first likelihood information of the first packet data or second likelihood information of the second packet data; generate inversion data in order to convert the first packet data into scrambled data having been scrambled with the second scrambling seed or the second packet data into scrambled data having been scrambled with the first scrambling seed; generate third likelihood information by inverting signs of one of the first likelihood information or the second likelihood information based on the inversion data; and generate fourth likelihood information based on the third likelihood information and the other of the first likelihood information and the second likelihood information.

Figure 1:
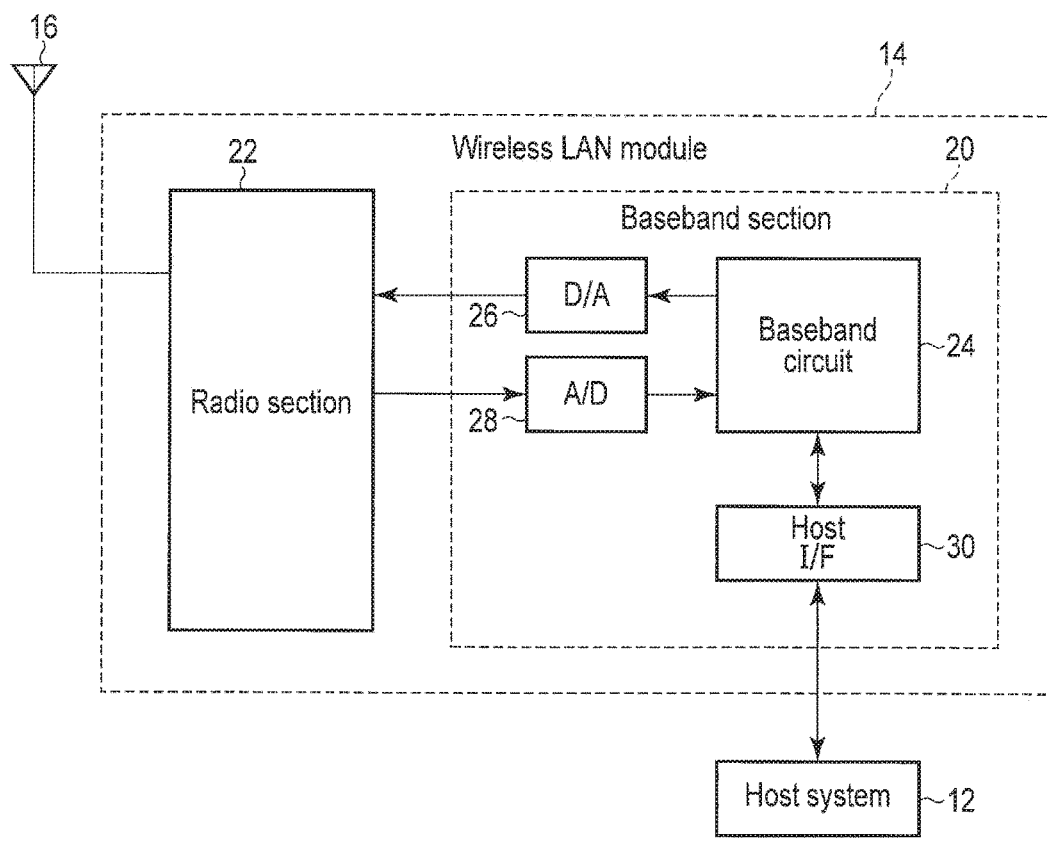
FIG. 1 is an exemplary block diagram illustrating a structure of a radio communication device according to an embodiment.

FIG. 1 is a block diagram illustrating an exemplary structure of a radio communication device according to an embodiment. The embodiment may be applicable to any radio communication. For instance, it may be applicable to a wireless LAN which is based on an IEEE 802.11 standard. The radio communication device according to the embodiment may be implemented as any one of an access point which is a base station for a wireless LAN, a radio communication terminal (which may also be merely called a "terminal"), and a relay station. Examples of the terminal may be enumerated as follows: a mobile terminal, a television set, a digital camera, a wearable device, a tablet, a smart phone, a cellular phone, a game device, a network storage device, a monitor, a digital audio player, a Web camera, a video camera, a projector, a navigation system, a set top box, a gateway, a printer server, a mobile access point, a router, an enterprise/service provider access point, a portable device, a handheld device, and so forth.

A wireless LAN module 14 is connected between an antenna 16 and a host system 12 and includes a radio section 22 connected to the antenna 16 and a baseband section 20 connected to the host system 12. The wireless LAN module 14 may include a single chip IC or, alternatively, may include two separate IC chips, one forming the radio section 22 and the other forming the baseband section 20. The antenna 16 may be a chip antenna, or an antenna made of a wiring on a printed circuit board, or an antenna made of a linear conductive element. The antenna 16 is not confined to a single antenna but it is possible that the antenna 16 may include a plurality of antennas just as a Multiple User Multiple-Input Multiple-Output (MU-MIMO) system does. The baseband section 20 and the host system 12 may be connected with each other directly or, alternatively, through a connecting cable. If either the wireless LAN module 14 or the baseband section 20 includes an IC chip, the baseband section 20 may be connected to the host system 12 through a wiring of a printed circuit board in which the IC chip is installed. The host system 12 performs communication with an external device in accordance with an arbitrarily selected communication protocol using the wireless LAN module 14 and the antenna 16. The communication protocol may be a TCP/IP protocol, and may further include a protocol employed in a much upper layer. It is possible that the wireless LAN module 14 may execute a TCP/IP protocol, and that the host system 12 may execute only a protocol employed in a much upper layer. A process of the host system 12 may be performed by software (program) with the help of a processor, such as a CPU, or by hardware, or by a combination of software and hardware.

The baseband section 20 includes a host interface 30 which transmits and receives binary data to and from the host system 12, a baseband circuit 24, a D/A converter 26, and an A/D converter 28. Examples of the host interface 30 may be enumerated as follows: a Universal Asynchronous Receiver Transmitter (UART), a Serial Digital Interface (SPI), a Secure Digital Input/Output (SDIO), a USB, a PCI Express, etc. However, any interface may be applicable to the host interface 30. The host interface 30 may also include a buffer memory for delivering a frame etc. between the host system 12 and the baseband circuit 24. The buffer memory may be either a volatile memory, such as a DRAM, or a nonvolatile memory, such as a flash memory or an MRAM. The baseband circuit 24 outputs a transmitted signal through the D/A converter 26 to the radio section 22, and inputs the received signal from the radio section 22 through an A/D converter 28. The radio section 22 forms a radio communication section or a Radio Frequency (RF) integrated circuit which transmits and receives a frame through the antenna 16. As an example, the baseband circuit 24 in the embodiment corresponds to a portion which performs a process, including DA conversion, of the digital region at the time of transmission and a portion which performs a process after AD conversion at the time of reception. The baseband circuit 24 may include integrated circuits. The radio section 22 (an RF integrated circuit) corresponds to a portion which performs a process after the DA conversion at the time of transmission, and a portion which performs a process before the AD conversion at the time of reception. The integrated circuit for radio communication according to the embodiment includes at least the baseband integrated circuit 24. It is needless to say that the functions enumerated above may be differently divided among the blocks or between the baseband integrated circuit 24 and the RF integrated circuit 22.

Figure 2:
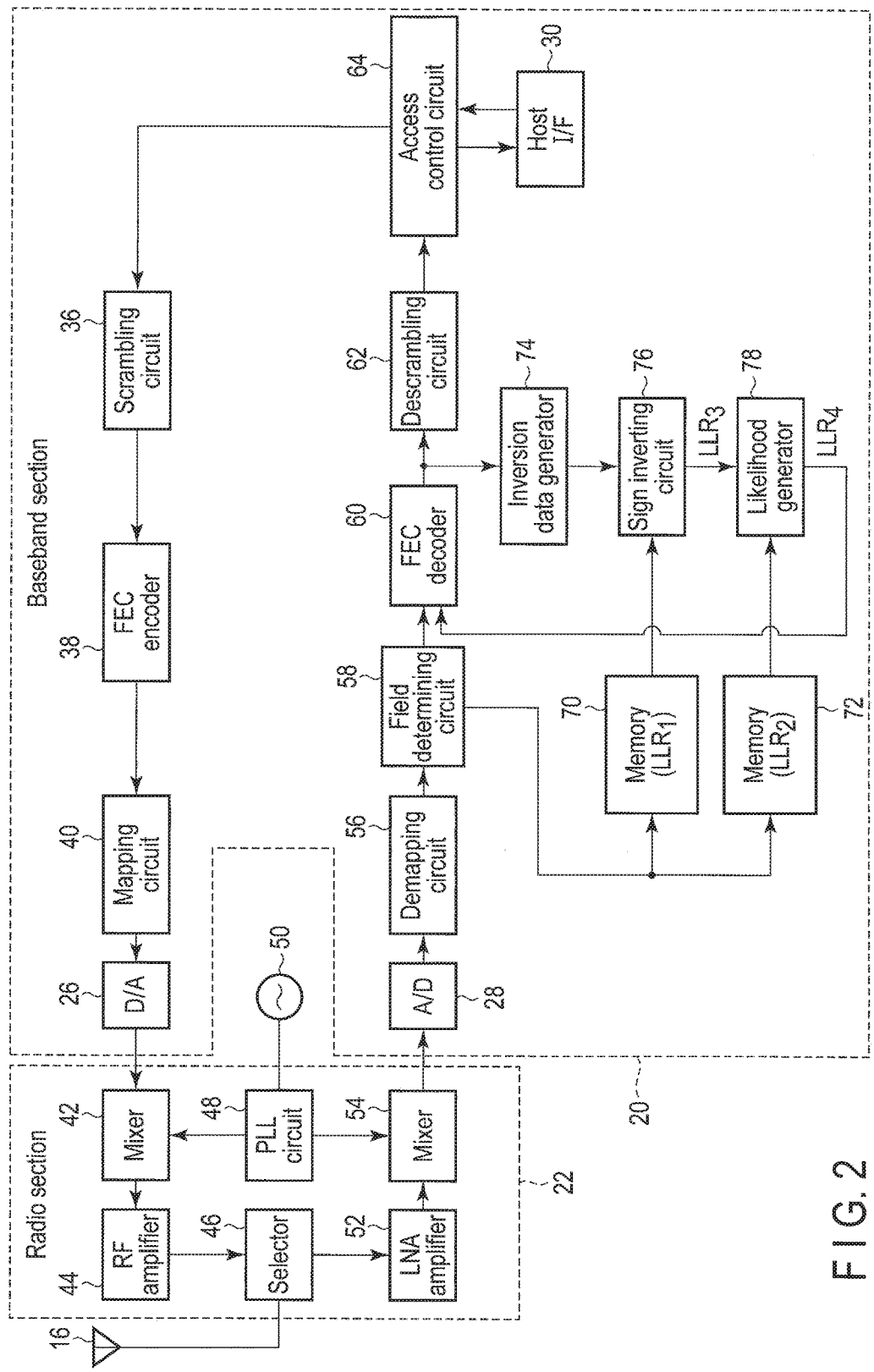
FIG. 2 is an exemplary block diagram illustrating a detailed structure of a wireless LAN module of FIG. 1.

FIG. 2 is a detailed block circuit diagram of an exemplary wireless LAN module 14. The host interface 30 supplies transmitted data to an access control circuit 64. The access control circuit 64 makes the data have a data size suitable for a packet format which the wireless LAN can process. Then, a scrambling circuit (also called a scrambler) 36 subjects the resultant data to a scrambling process. The access control circuit 64 generates a header which is binary data, adds the header to a head of a payload section, and supplies the resultant data to the scrambling circuit 36.

FIG. 3 illustrates in detail an exemplary structure of the scrambling circuit 36. It should be noted that a descrambling circuit (also called a descrambler) 62, which will be described later, has the same structure as the scrambling circuit 36 has, as illustrated in FIG. 3.

The scrambling circuit 36 includes a shift register which includes a large number of serially connected flip-flops. The scrambling circuit 36 processes the data and replaces "0's" with "1's" and "1's" with "0's" according to a scrambling code (sign inversion), thereby converting the input data (the transmitted data) into pseudo random data. In radio communication, transmitted data is generally subjected to a scrambling process in order to make a transmitted signal smooth in frequency spectrum (for avoiding a spike-shaped spectrum) or in order to make small a Peak to Average Power Ratio (PAPR: percentage of a peak amplitude and a mean amplitude) of the time waveform of the transmitted signal.

A structure of the scrambling circuit 36 (or a shift register) may be expressed by a generator polynomial S(x). FIG. 3 illustrates an example in which a total of seven flip-flops 104, 106, 108, 110, 112, 114, and 116 are connected in series. The fourth flip-flop 110 and the seventh flip-flop (at the output end) 116, each counted from the input end, supply their respective outputs $x_4$ and $x_7$ to an EX-OR circuit 118. In this case, the generator polynomial S(x) may be expressed as: $S(x)=x_7+x_4+1$.

Upon entrance of a clock, the shift register will move data to left-hand side, and will output a one-bit scrambling code from the EX-OR circuit 118. The output (scrambling code) of the EX-OR circuit 118 is not only supplied to an EX-OR circuit 102 but also fed back to the flip-flop 104 at the input end of the shift register. A sequence of input data is supplied to the EX-OR circuit 102 in one bit at a time in synchronization with a clock. If a scrambling code is "0", the EX-OR circuit 102 outputs input data as it is, and, if a scrambling code is "1", the EX-OR circuit 102 inverts input data "0" or "1" and outputs the inverted data. The output of the EX-OR circuit 102 is a scrambled result.

A scrambling code is determined by a generator polynomial and a scrambling seed (also called an initial value). The scrambling seed is data which includes data pieces, which the seven flip-flops 104, 106, 108, 110, 112, 114, and 116 respectively have in their respective initial states, and has a data pattern comprising any combination of "1's" and "0's" except for a combination of all "0's." Therefore, if scrambling circuits are the same in structure (generator polynomial) but if scrambling seeds are different, scrambling codes will be different. It should be noted that the scrambling code is cyclic and changes its cycle according to the number of stages (the number of flip-flops) which a shift register has.

The scrambling circuit 36 and the descrambling circuit 62 are not restricted in structure to what is illustrated in FIG. 3. Any structure (generator polynomial) may be used if only a transmitter and a receiver are the same in structure. It is optional how many flip-flops are used, or which flip flop is selected to use its output, or which operation except for exclusive OR operation is used for synthesizing the outputs of a plurality of flip-flops. In radio communication, a transmitter and a receiver previously know a generator polynomial of their respective scrambling circuits. There is a radio system, in which a scrambling seed itself or a scrambling seed change rule is previously known. Or there is another radio system, in which a transmitter inserts a scrambling seed in a preamble section, header, etc. of a transmitted signal, and transmits the resultant signal to a receiver, and in which the receiver extracts the scrambling seed from the preamble section, header, etc. of the received signal, and sets the extracted scrambling seed to a descrambling circuit of the receiver. The receiver subjects the received signal to the descrambling (scrambling) process with the use of a scrambling circuit (with the same scrambling seed) which is the same as that of the transmitter, thereby obtaining restored data.

Returning to FIG. 2, an output of the scrambling circuit 36 is supplied to a Forward Error Correction (FEC) encoder (error correction encoder) 38, in which an input is subjected to an error correction coding. For example, convolution coding, turbo coding, Low Density Parity Check (LDPC) coding, etc. may be enumerated as some of the error correction coding.

An output of the FEC encoder 38 is supplied to a mapping circuit 40, where "0's" and "1's" which are in the transmitted data and have been subjected to the scrambling process are mapped (modulated) to complex baseband signals. Binary Phase Shift Keying (BPSK), Quadrature Phase Shift Keying (QPSK), Quadrature Amplitude Modulation (QAM), etc. may be enumerated as some examples of the mapping, but any modulation method may be applicable.

An output of the mapping circuit 40 is supplied to a mixer 42 through the D/A converter 26. The mixer 42 also receives an output of a Phase Locked Loop (PLL) circuit 48. The PLL circuit 48 receives an oscillation signal, which is supplied from an oscillator 50, and divides and/or multiplies the oscillation signal, thereby outputting a signal which has a constant frequency and is in synchronization with a phase of the output of the D/A converter 26. The mixer 42 upward converts the output of the D/A converter 26 into a signal having a radio frequency based on the output of the PLL circuit 48.

An output of the mixer 42 is supplied to a selector 46 through an RF amplifier 44. The selector 46 changes its selection between a transmission time and a reception time, and selects the RF amplifier 44 at the time of transmission. Therefore, a transmitted packet (also referred to as a transmitted frame) of a radio frequency is sent through the selector 46 and the antenna 16.

The radio section 22 also has a Low Noise Amplifier (LNA) 52 which is connected to the selector 46. The selector 46 selects the LNA 52 at the time of reception. Therefore, the antenna 16 supplies a received radio frequency signal through the LNA 52 to a mixer 54. The mixer 54 down converts the output of the LNA 52 based on the output of the PLL circuit 48.

An output of the mixer 54 is supplied to a demapping (demodulation) circuit 56 through the A/D converter 28. The demapping circuit 56 changes the received signal into either "1" or "0." Specifically, it does not merely change the signal into "1" or "0", but does change the signal into likelihood information indicative of a probability of "1" or "0." Likelihood information is soft value data comprising an amount of amplitude and a sign and indicating that a probability that a received signal will be set to "1" is 80% and a probability that the received signal will be set to "0" is 20%, for instance. For example, likelihood information having a positive sign and a large amplitude indicates that the probability that the received data is "1" is high, whereas likelihood information having a negative sign and a large amplitude indicates that the probability that the received data is "0" is high. Generally, a radio communication signal is distorted under the influence of the noise caused by radios or the fading occurring in a propagation path. Accordingly, the demapping circuit 56 calculates likelihood information with consideration given to the influence of distortion or noise.

The likelihood information output from the demapping circuit 56 is supplied to a field determining circuit 58. The field determining circuit 58 determines whether the supplied likelihood information relates to the field for combination. If the supplied likelihood information relates to the field for combination, the field determining circuit 58 will supply the likelihood information to an FEC decoder 60. Furthermore, the field determining circuit 58 supplies the likelihood information to a memory 70 or 72. If the supplied likelihood information does not relate to the field for combination, the field determining circuit 58 will supply the likelihood information only to the FEC decoder 60. The determination of whether or not the likelihood information relates to the field for combination may be made as follows, for example. A received packet has a preamble section and a payload section. Therefore, it is possible to determine that the preamble section does not relate to the field for combination and the payload section relates to the field for combination, for instance. The FEC decoder 60 subjects the likelihood information to error correction decoding with the use of the decode system which corresponds to the error correcting code used by the FEC encoder 38. The FEC decoder 60 fundamentally performs a decoding process based on the likelihood information outputted from the demapping circuit 56. However, when new likelihood information is supplied from a likelihood generator 78, which will be described later, the FEC decoder 60 performs its decoding process based on the new likelihood information. Decoded data (binary data) outputted from the FEC decoder 60 is supplied to the descrambling circuit 62 and an inversion data generator 74.

The descrambling circuit 62 is the same in structure as the scrambling circuit 36 illustrated in FIG. 3. An output of the descrambling circuit 62 is supplied to the access control circuit 64. The access control circuit 64 executes a CRC check and determines whether the decoded data includes any error. If it is determined that the decoded data does not include any error, the access control circuit 64 transmits acknowledgment (ACK) to the transmitting end and supplies the decoded data to the host interface 30. If the decoded data includes even one bit error, acknowledgment ACK will not be transmitted to the transmitting end. Any decoded data will be discarded if it includes even one bit error. When the transmitting end does not receive acknowledgment ACK even if a fixed time has passed after data transmission, the transmitting end retransmits the transmitted data. Alternatively, if the decoded data includes an error, the access control circuit 64 transmits negative acknowledgement (NACK) to the transmitting end. The transmitting end will retransmits the transmitted data upon reception of negative acknowledge NACK. When retransmission is repeated several times, a CRC error will be 0 sometime or other. In the present embodiment, however, decoding accuracy will be improved because of combination of likelihood information of the initially transmitted packet and likelihood information of a retransmitted packet. Likelihood information has amplitude which includes distortion components with respect to original amplitude because of noises and channel characteristics. Distortion may include random distortion components which are random under the influence of thermal noises, which a receiver produces, and characteristics, which a propagation path has. Distortion may be reduced by half when the random distortion components are added (it may fall by 3 dB). Addition of two kinds of likelihood information can remove the influence of noises and makes it possible to obtain proper likelihood information. It is possible to set an upper limit to a retry count without infinitely requesting retransmission until the CRC error is set to 0.

In this way, if the decoding result of received data includes an error, the same data will be retransmitted. The memory 70 stores likelihood information $LLR_1$ of the initially received packet. The memory 72 stores likelihood information $LLR_2$ of a packet received at the time of retransmission. Here, let us assume that the transmitter changes the scrambling seed at the time of retransmission, and that the changed scrambling seed is inserted in a preamble section, a header, or the like, of a transmitted packet, and is transmitted to the receiving end. The memory 70 may store the whole of likelihood information $LLR_1$ of the initially transmitted packet as much as possible. In contrast, the memory 72 may temporarily store likelihood information $LLR_2$, which corresponds to the latency of an inversion data generation process and a sign inversion process, both of which will be described later. Therefore, it is possible that an array of registers may be substituted for the memory 72.

The present embodiment changes signs in the scrambled output of the initially transmitted packet or signs in the scrambled output of a retransmitted packet in order to compensate for the difference in sign sequence in data series produced by the difference in scrambling seed between the initially transmitted packet and a retransmitted packet. The inversion data generator 74 generates inversion data (data series) for this inversion. What is illustrated in FIG. 4 is an exemplary inversion data generator 74. An output of the FEC decoder 60 is supplied to a seed extraction circuit 122, which extracts a scrambling seed from the output data of the decoder 60. Scrambling seed $Seed_1$ of the initially transmitted packet is stored in a memory 124, and scrambling seed $Seed_2$ of a retransmitted packet is supplied to an EX-OR circuit 126. $Seed_1$ stored in the memory 124 is also supplied to the EX-OR circuit 126. The EX-OR circuit 126 perform an exclusive OR operation for the scrambling seed $Seed_1$ of the initially transmitted packet and the scrambling seed $Seed_2$ of the retransmitted packet, and supplies the exclusive OR value to a scrambling circuit 128 as a third scrambling seed $Seed_3$.

For example, let us regard scrambling seed $Seed_1$ of the initially transmitted packet as [1111000] and scrambling seed $Seed_2$ of the retransmitted packet as [0101100], then exclusive OR value $Seed_3$ of the scrambling seed of the initially transmitted packet and the scrambling seed of the retransmitted packet will be [101010 0].

The scrambling circuit 128 is also the same in structure as what is illustrated in FIG. 3. The exclusive OR value of the scrambling seed $Seed_1$ of the initially transmitted packet and scrambling seed $Seed_2$ of the retransmitted packet is supplied as scrambling seed $Seed_3$ to the scrambling circuit 128, and a zero series (0000 . . . 0 continues as long as packet length) is supplied as input data to the scrambling circuit 128, whereby scrambled output is obtained. The scrambled output is supplied to an FEC encoder 132, which is the same in structure as the encoder 38, and is subjected to error correction coding, whereby inversion data is obtained. Since the scrambling circuit 128 and the FEC encoder 132 are binary process circuits, the scrambling circuit 36 and the FEC encoder 38, both at the transmitting section, may be used in place of the scrambling circuit 128 and the FEC encoder 132, both at the receiving section.

Inversion data output from the inversion data generator 74 is supplied to the sign inverting circuit 76. The likelihood information $LLR_1$ of the initially transmitted packet from the memory 70 is supplied to the sign inverting circuit 76. An exemplary principle of the sign inverting circuit 76 is illustrated in FIG. 5. The initially transmitted packet and the retransmitted packet were the same (raw data) at the beginning. However, since the scrambling circuit uses different scrambling seeds, data series obtained for the initially transmitted packet and data series obtained for the retransmitted packet are different from each other. The former is data series $Data_1$ [0110110 . . . ] and the latter is $Data_2$ [1010011 . . . ]. In FIG. 5, attention is paid only to signs. However, the scrambled output of the initially transmitted packet and the scrambled output of the retransmitted packet are also different in amplitude. However, they are both generated by the same scrambling circuit 36 and the same FEC encoder 38, and the generator polynomial of the scrambling circuit 36 is a formula of linear arithmetic operation. Accordingly, when the data series $Data_1$ [0110110 . . . ] of the scrambled output of the initially transmitted packet is inverted using the inversion data [1100101 . . . ] generated based on the scrambling seed $Seed_1$ of the initially transmitted packet and the scrambling seed $Seed_2$ of the retransmitted packet, as illustrated in FIG. 5, the sign sequence in the data series $Data_1$ [0110110 . . . ] of the scrambled output of the initially transmitted packet can be made equal to the sign sequence in a data series which is obtained by scrambling the original packet data using the scrambling seed $Seed_2$ of the retransmitted packet. It should be noted that the inversion process is a bitwise EX-OR process. Accordingly, reverse inversion may also be possible. That is, the sign sequence in the data series $Data_2$ [1010011 . . . ] of the scrambled output of the retransmitted packet can be returned to the sign sequence in a data series which is obtained by scrambling the original packet data using the scrambling seed $Seed_1$ of the initially transmitted packet. In such a case, the data stored in the memory 70 and the data stored in memory 72 may be exchanged, so that the memory 70 stores likelihood information $LLR_2$ of the retransmitted packet, and the memory 72 stores likelihood information $LLR_1$ of the initially transmitted packet. Furthermore, the scrambling seed $Seed_1$ of the initially transmitted packet may be set to the descrambler circuit 62 as its scrambling seed.

FIG. 6 illustrates an exemplary operation of the sign inverting circuit 76. Likelihood information $LLR_1$ of the initially transmitted packet stored in the memory 70 is supplied to the sign inverting circuit 76. The sign inverting circuit 76 changes the signs in likelihood information $LLR_1$ of the initially transmitted packet according to the inversion data. The likelihood information does not change in amplitude. If the inversion data is "1," a sign in likelihood information $LLR_1$ is inverted. If the inversion data is "0," a sign in likelihood information $LLR_1$ is not inverted. In this way, the signs in likelihood information $LLR_1$ are inverted. Likelihood information $LLR_3$ having been obtained by such a sign inversion is supplied to the likelihood generator 78.

Likelihood information $LLR_2$ of the retransmitted packet stored in the memory 72 is also supplied to the likelihood generator 78. The likelihood generator 78 generates, based on likelihood information $LLR_2$ and likelihood information $LLR_3$, new likelihood information $LLR_4$ which is a combination of likelihood information $LLR_2$ and likelihood information $LLR_3$. Likelihood information $LLR_4$ is supplied to the FEC decoder 60.

Figure 7:
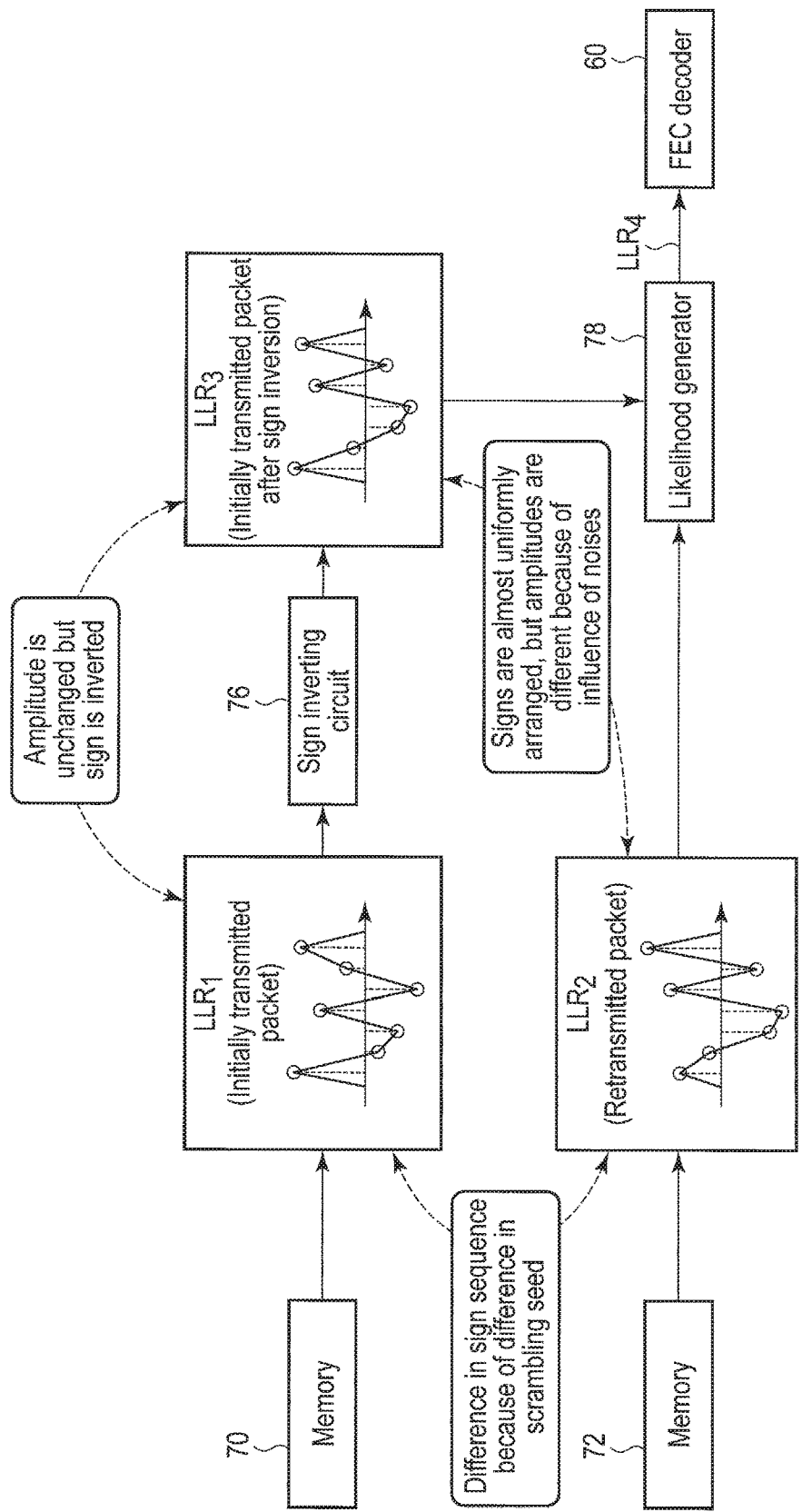
FIG. 7 exemplarily illustrates an operation of a likelihood generator 78 of FIG. 2.

FIG. 7 illustrates an exemplary combining operation of the likelihood generator 78. Likelihood information $LLR_1$ of the initially transmitted packet stored in the memory 70 is subjected to sign inversion at the sign inverting circuit 76, whereby likelihood information $LLR_3$ of the initially transmitted packet is obtained. In likelihood information $LLR_3$, the difference in sign sequence caused by the difference in scrambling code between the initially transmitted packet and the retransmitted packet is dissolved by the sign inversion process. That is, likelihood information $LLR_1$ and likelihood information $LLR_3$ are completely the same in amplitude but different in sign sequence. On the other hand, likelihood information $LLR_1$ of the initially transmitted packet and likelihood information $LLR_2$ of the retransmitted packet are different in sign sequence because of difference in scrambling seed. However, likelihood information $LLR_2$ of the retransmitted packet and likelihood information $LLR_3$ of the initially transmitted packet after sign inversion are resolved in terms of difference in sign sequence caused by difference in scrambling code, and should ideally be the same in sign sequence. However, they may not always be the same in sign sequence because of noises or propagation paths. Likelihood information $LLR_2$ and likelihood information $LLR_3$ may be almost the same in sign sequence, but may be somewhat different from each other in amplitude. Consequently, if they are combined, new likelihood information will be generated, which the likelihood generator 78 does, and new likelihood information $LLR_4$ which is reduced in influence of noises is obtained. There are various examples which generate new likelihood information. For example, there is a process in which two kinds of likelihood information are linearly added as follows:

$LLR_4(k)=C_2(k) \times LLR_2(k)+C_3(k) \times LLR_3(k),$ wherein k=1, 2, 3, . . . , N.

N stands for a data length for binary data which has been error-correcting-coded. Linear addition coefficients $C_2(k)$ and $C_3(k)$ are dependent on implementation. For example, the linear addition coefficients may be set as follows in all the k's:

$C2(k)=1/(R+1)$ $C3(k)=R/(R+1)$

Here, R stands for a retry count (if it is the first retransmission, then R will be 1).

The provision of linear addition coefficients in this way makes it possible to subject likelihood information to a moving average process when the retry count is high, whereby the influence of noises will be reduced.

Alternatively, it is possible to set $C_2(k)$ and $C_3(k)$ as follows. Then, a process of selecting one of two kinds of likelihood information will be obtained. This process makes it possible to select highly reliable likelihood information by simple implementation.

If $|LLR_2(k)| \geq |LLR_3(k)|$, then $C_2(k)=1$ and $C_3(k)=0.$

If $|LLR_2(k)| < |LLR_3(k)|$, then $C_2(k)=0$ and $C_3(k)=1.$

It should be noted that FIG. 7 illustrates an example, in which signs in likelihood information $LLR_1$ of the initially transmitted packet are inverted. Alternatively, it is also possible that signs in likelihood information $LLR_2$ of a retransmitted packet may be inverted, as illustrated in FIG. 8.

In both cases, the same inversion data may be used, but scrambling seeds which the descrambling circuit 62 uses should be set as illustrated in FIGS. 9A and 9B.

FIG. 9A illustrates an example, in which the descrambling circuit 62 uses, as its scrambling seed, scrambling seed $Seed_2$ of the retransmitted packet. In this case, the sign inverting circuit 76 subjects to sign inversion likelihood information $LLR_1$ of the initially transmitted packet stored in the memory 70, thereby providing sign inverted likelihood information $LLR_3$ as its output. The likelihood generator 78 linearly adds sign inverted likelihood information $LLR_3$ and likelihood information $LLR_2$ of the retransmitted packet stored in the memory 72 or, alternatively, selects either sign inverted likelihood information $LLR_3$ or likelihood information $LLR_2$ of the retransmitted packet stored in the memory 72, thereby generating new likelihood information $LLR_4$. The FEC decoder 60 subjects new likelihood information $LLR_4$ to error correction decoding, and the descrambling circuit 62 descrambles the decoded result using scrambling seed $Seed_2$.

FIG. 9B illustrates an example, in which the descrambling circuit 62 uses, as its scrambling seed, scrambling seed $Seed_1$ of the initially transmitted packet. In this case, the sign inverting circuit 76 subjects to sign inversion likelihood information $LLR_2$ of the retransmitted packet stored in the memory 70, thereby generating sign inverted likelihood information $LLR_3$ as its output. The likelihood generator 78 linearly adds sign inverted likelihood information $LLR_3$ and likelihood information $LLR_1$ of the initially transmitted packet stored in the memory 72 or, alternatively, selects either sign inverted likelihood information $LLR_3$ or likelihood information $LLR_1$ of the initially transmitted packet stored in the memory 72, thereby generating new likelihood information $LLR_4$. The FEC decoder 60 subjects new likelihood information $LLR_4$ to error correction decoding, and the descrambling circuit 62 descrambles the decoded result using scrambling seed $Seed_1$.

A likelihood composing process is executed for a retransmitted packet in the above explained way.

FIG. 10 exemplarily illustrates how a received packet having a certain format is processed. In a general packet, a preamble is required for controlling a physical layer and is arranged at the forefront of the packet. A header and a payload are successively arranged following the preamble. It should be noted that the preamble and the header may be collectively called a preamble in some cases. In an exemplary packet in accordance with IEEE 802.11ax, a preamble includes a legacy preamble and a preamble specific to 802.11ax. The legacy preamble includes a legacy-short training field (L-STF), a legacy-long training field (L-LTF), and a legacy-signal field (L-SIG). The preamble specific to 802.11ax includes a highly efficient signal field A/B (HE-SIG A/B), a highly efficient short training field (HE-STF), and a highly efficient long training field (HE-LTF). A service field and a MAC header successively follow the preamble. Thereafter, a frame body further follows as a data body. A frame check sequence (FCS), which follows the frame body, is a sequence of checksum codes which a receiving end uses for detecting errors in every packet it receives. An exemplary sequence of checksum codes includes a cyclic redundancy code (CRC).

In a conventional packet, a scrambling seed for a scrambling circuit may be stored in the preamble or header. In an IEEE 802.11ax packet, the scrambling seed may be stored in the service field. Therefore, when a conventional packet has been received, the inversion data generator 74 begins to operate immediately after the preamble or header has been decoded (immediately after a scrambling seed has been received). The analysis of packet information stored in the preamble or the header makes it possible to determine whether a received packet is the initially transmitted packet or retransmitted packet. As soon as the determination of whether the received packet is the initially transmitted packet or retransmitted packet has been completed, the likelihood generator 78 begins to operate. In contrast, when an IEEE 802.11ax packet has been received, acquisition of likelihood information $LLR_2$ is started in timing t1 at which reception of the preamble finishes. When acquisition of a scrambling seed begins at timing t2 in the middle of the service field, the inversion data generator 74 begins to operate, and generation of inversion data begins. At timing t3 in which the latency caused by the processes executed by the FEC encoder 132 and the sign inverting circuit 76 has passed since timing t2, acquisition of likelihood information $LLR_1$ after sign inversion begins. The analysis of packet information stored in the MAC header makes it possible to determine whether the received packet is the initially transmitted packet or retransmitted packet. When it is determined that the received packet is a retransmitted packet at timing t4, the likelihood generator 78 begins to operate, and the FEC decoder 60 begins to decode new likelihood information $LLR_4$. Therefore, the period from timing t1 of finishing reception of the preamble to timing t4 of determining whether the received signal is retransmitted or not is the latency which is additionally required according to the present embodiment.

It should be noted that the preamble or header of a received packet may further include additional information indicating that the received packet is a retransmitted packet addressed to whom. The FEC decoder 60 decodes, based on the additional information, likelihood information $LLR_1$ of the presently received packet having been outputted from the demapping circuit 56 or new likelihood information $LLR_4$ having been outputted from the likelihood generator 78. This makes it possible not only to perform likelihood combination only in the case of a retransmitted packet, resulting in improvement in packet retransmission, but also to prevent likelihood combination from being performed in the case of a new packet, thereby preventing occurrence of any incorrect decoded result. For example, ID information of a user is stored in a signal field (HE-SIG-B) of a preamble in an IEEE 802.11ax multiuser format. Accordingly, it is possible to determine whether or not a likelihood combination process should be executed based on whether or not there is ID information of the user in the signal field.

Moreover, if a retransmitted packet is received, and if the decoded result of new likelihood information $LLR_4$ having been outputted from the likelihood generator 78 also includes any CRC error, the likelihood information of the retransmitted packet is stored, the new likelihood information is stored in the memory 72 or memory 70, and likelihood combination which is executed at the time of the retransmission and is the same as what is described above is performed.

In a radio communication device in the present embodiment, even if a scrambling seed set to a scrambling circuit at a time of initial transmission is different from a scrambling seed set to the scrambling circuit at a time of retransmission, inversion data might be generated from the scrambling seed at the time of initial transmission and the scrambling seed at the time of retransmission, and the generated inversion data might be used for inverting signs in the likelihood information of either the initially transmitted packet or a retransmitted packet, whereby the likelihood information having been subjected to the sign inversion and the likelihood information of the initially transmitted or retransmitted packet could be made the same in sign sequence and it would be possible to combine the likelihood information of the initially transmitted packet and the likelihood information of the retransmitted packet. Since a sign inversion process is a binary process, a circuit can be made small in scale. There is no need for adding an exclusive circuit for sign inversion. It is possible to apply to sign inversion a decoder, or an encoder, or a descrambling circuit which any ordinary radio communication device has for a binary process. This makes it possible to provide a radio communication device which is simple in structure and can surely combine likelihood information of the initially transmitted packet and likelihood information of a retransmitted packet.

Other embodiments will be explained.

Second Embodiment

FIG. 11 minutely illustrates an exemplary structure of a wireless LAN module according to a second embodiment. The second embodiment is almost the same as the first embodiment illustrated in FIG. 2. The only difference resides in that a packet identification circuit 82 is further connected to an output of the likelihood generator 78. New likelihood information $LLR_4$ outputted from the likelihood generator 78 and likelihood information $LLR_2$ of the retransmitted packet outputted from the memory 72 are supplied to the packet identification circuit 82.

Figure 12A:
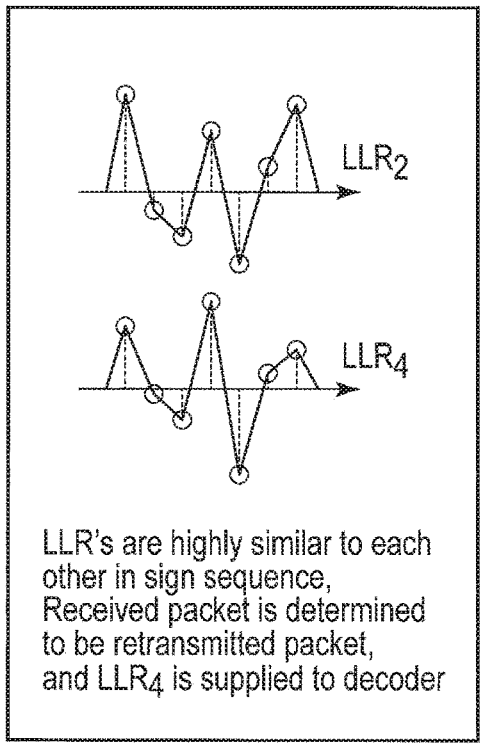
FIG. 12A exemplarily illustrates an operation of a packet identification circuit 82 of FIG. 11.
Figure 12B:
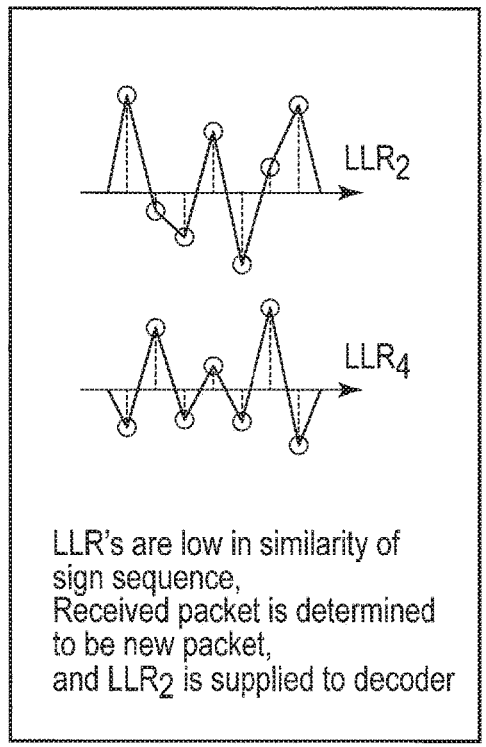
FIG. 12B exemplarily illustrates another operation of a packet identification circuit 82 of FIG. 11.

As illustrated in FIGS. 12A and 12B, the packet identification circuit 82 compares likelihood information $LLR_4$ and likelihood information $LLR_2$, and identifies whether the received packet is a new packet or a retransmitted packet. If new likelihood information $LLR_4$ and likelihood information $LLR_2$ are highly similar to each other in sign sequence as illustrated in FIG. 12A, the received packet is determined to be a retransmitted packet, and new likelihood information $LLR_4$ is supplied to the FEC decoder 60. In contrast, if it is low in similarity of sign sequence between new likelihood information $LLR_4$ and likelihood information $LLR_2$ as illustrated in FIG. 12B, the received packet is determined to be not a retransmitted packet but a new packet, and likelihood information $LLR_2$ is supplied to the FEC decoder 60.

In a radio communication device in the second embodiment, a sign sequence in likelihood information of a presently received packet is compared with a sign sequence in likelihood information of an immediately preceding packet. Based on the similarity between them, it is determined whether or not the presently received packet is a retransmitted packet. If the presently received packet is determined to be a retransmitted packet, new likelihood information outputted from the likelihood generator 78 will be decoded, whereas, if the presently received packet is determined not to be a retransmitted packet, the likelihood information of the presently received packet will be decoded. This makes it possible to perform likelihood combination only in the case of a retransmitted packet but not to perform likelihood combination in the case of a new packet. Accordingly, a retransmitted packet will improve in reliability, and a new packet will be prevented from being wrongly decoded. It should be noted here that a receiving end in the first embodiment requires decoding the preamble or header of a received packet, determining whether the packet is a retransmitted packet addressed to the receiving end, and performing likelihood combination after it is determined that the packet is a retransmitted packet addressed to the receiving end. In contrast to this, a receiving end in the second embodiment has a packet identification circuit 82 which determines whether a received packet is a retransmitted packet addressed to the receiving end, so that the receiving end can begin a likelihood combination process without waiting for decoding results of a preamble or header. That is, the second embodiment is shorter than the first embodiment in latency required for performing a likelihood combination process. In the second embodiment, the memory 70 may store likelihood information $LLR_1$ of the initially transmitted packet as much as possible, whereas the memory 72 may just store temporarily likelihood information $LLR_2$ corresponding to the latency of an inversion data generation process and a sign inversion process, both of which will be described later. Therefore, a simple register can be substituted for the memory 72.

Third Embodiment

FIG. 13 minutely illustrates an exemplary structure of a wireless LAN module according to a third embodiment. The third embodiment is almost the same as the second embodiment illustrated in FIG. 11, but is different in the following points. An FEC decoder 84 is connected to an output of the packet identification circuit 82 and a descrambling circuit 86 is connected to an output of the FEC decoder 84. An output of the descrambling circuit 62 and an output of the descrambling circuit 86 are supplied to the host interface 30 through the access control circuit 64.

The FEC decoder 60 executes decoding using only likelihood information $LLR_1$ of the presently received packet. The FEC decoder 84 executes decoding using new likelihood information $LLR_4$ obtained by combining likelihood information of the presently received packet and likelihood information of the previously received packet. The access control circuit 64 compares the (descrambled) decoded result of the decoder 60 and the (descrambled) decoded result of the decoder 84, determines which one of the decoded results is suitable, and supplies a comparison result to the host interface 30. To determine a suitable decoded result, decoded results are supplied to a CRC detector. A CRC result is used as a criterion of determination, for example. Alternatively, a similarity to the last decoded result may be used as a criterion of determination.

If a received packet includes a plurality of frames in the third embodiment, it may be possible that only some of the frames will be retransmitted and yet likelihood combination will be performed. Therefore, the third embodiment may be applicable even to such a radio communication device that uses frame aggregation as illustrated in FIG. 14. Initially transmitted packet has three frames, in which first two frames, frame 1 and frame 2, are normally received without any CRC errors but the last frame, frame 3, is not normally received because of the presence of any CRC error. In this case, it is not necessary to retransmit the whole packet but it is sufficient to retransmit only the third frame. Therefore, a new packet including the third frame (retransmission), new frames 4 and 5 will be transmitted as retransmission. The memory 70 stores the likelihood information of the frame 3 of the initially transmitted packet. The memory 72 stores the likelihood information of the frame 3 of the retransmitted packet. The likelihood information of the initially transmitted packet and the likelihood information of the retransmitted packet are combined.

A radio communication device in the third embodiment compares the decoded result of the likelihood information of a presently received packet with the decoded result of the synthetic likelihood information obtained by combining the likelihood information of the presently received packet and the likelihood information of a previously received packet, thereby determining whether the presently received packet is a retransmitted packet and selects one of the decoded results. This makes it possible to perform likelihood combination only in the case of a retransmitted packet but not to perform likelihood combination in the case of a new packet. Accordingly, a retransmitted packet will improve in reliability, and a new packet will be prevented from being wrongly decoded. The third embodiment can begin a likelihood combination process without waiting for decoding results of the preamble or header as the second embodiment does. That is, the third embodiment is shorter than the first embodiment in latency required for performing a likelihood combination process. In the third embodiment, the likelihood information of the immediately preceding packet is stored in the memory 70, but the likelihood information of the presently received packet need not be stored in the memory 72.

Since the processing of the present embodiment can be implemented by the computer program, advantages similar to the advantages of the present embodiment can easily be obtained by installing the computer program in a computer via a computer-readable storage medium in which the computer program is stored and by merely executing the computer program.

Furthermore, the present invention is not restricted to the embodiments as they are. In an implementation stage, constituents may be modified without departing from the substance of the present invention. Moreover, various modifications may be made by properly combining the various constituents currently disclosed in the embodiments. For example, it may be possible to delete some constituents from all the constituents illustrated in any embodiment. Moreover, it may be possible to suitably combine various constituents taken from different embodiments.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An integrated circuit comprising:
   an input terminal configured to receive a radio wave of first packet data scrambled with a first scrambling seed and a radio wave of second packet data scrambled with a second scrambling seed through at least one antenna; and
   a baseband integrated circuit configured to:
      receive a signal of the first packet data and a signal of the second packet data;
      generate inversion data in order to convert the first packet data into first scrambled data scrambled with the second scrambling seed or in order to convert the second packet data into second scrambled data scrambled with the first scrambling seed;
      generate third likelihood information by inverting signs of one of first likelihood information of the first packet data or second likelihood information of the second packet data based on the inversion data; and
      generate fourth likelihood information based on the third likelihood information and the other of the first likelihood information or the second likelihood information.

2. The integrated circuit of claim 1, wherein
the baseband integrated circuit is configured to request transmission of the second packet data when a decoded result of the first likelihood information comprises an error.

3. The integrated circuit of claim 1, wherein
the first packet data comprises data resulting from scrambling transmitted data by a first scrambling circuit, wherein the first scrambling seed is set to the first scrambling circuit; and
the second packet data comprises data resulting from scrambling transmitted data by the first scrambling circuit, wherein the second scrambling seed is set to the first scrambling circuit.

4. The integrated circuit of claim 3, wherein
the baseband integrated circuit comprises a second scrambling circuit, wherein a third scrambling seed is set to the second scrambling circuit and a structure of the second scrambling circuit and a structure of the first scrambling circuit are the same.

5. The integrated circuit of claim 4, wherein
the first packet data comprises data obtained by encoding an output of the first scrambling circuit by a first error correction coding circuit, wherein the first scrambling seed is set to the first scrambling circuit;
the second packet data comprises data obtained by encoding an output of the first scrambling circuit by the first error correction coding circuit, wherein the second scrambling seed is set to the first scrambling circuit; and
the baseband integrated circuit comprises a second error correction coding circuit configured to encode an output of the second scrambling circuit wherein a function of the second error correction coding circuit and a function of the first error correction coding circuit are the same.

6. The integrated circuit of claim 4, wherein
the third scrambling seed comprises an exclusive OR value of the first scrambling seed and the second scrambling seed.

7. The integrated circuit of claim 1, wherein
the baseband integrated circuit is configured to add the third likelihood information to the other of the first likelihood information or the second likelihood information.

8. The integrated circuit of claim 1, wherein
the baseband integrated circuit is configured to select one of the third likelihood information and the other of the first likelihood information or the second likelihood information.

9. The integrated circuit of claim 1, wherein
the baseband integrated circuit is further configured to cause a memory to store at least one of the first likelihood information or the second likelihood information.

10. The integrated circuit of claim 9, wherein
the baseband integrated circuit is further configured to cause the memory to store the fourth likelihood information when a decoding result of the fourth likelihood information comprises an error.

11. The integrated circuit of claim 1, wherein
the baseband integrated circuit is further configured to receive the signal of the first packet data and the signal of the second packet data through a radio frequency integrated circuit, and
the baseband integrated circuit and the radio frequency integrated circuit are integrated into a single integrated circuit.

12. The integrated circuit of claim 1, further comprising
the at least one antenna, and
a radio frequency integrated circuit configured to be coupled to the at least one antenna,
wherein, the baseband integrated circuit is configured to receive the first packet data and the second packet data through the radio frequency integrated circuit.

13. A radio communication apparatus comprising:
at least one antenna;
radio circuitry configured to transmit and receive a frame through the at least one antenna;
a memory; and controller circuitry configured to
receive, through the radio device, a signal of first packet data scrambled with a first scrambling seed and a signal of second packet data scrambled with a second scrambling seed;
generate inversion data in order to convert the first packet data into fir t scrambled data scrambled with the second scrambling seed or in order to convert the second packet data into second scrambled data scrambled with the first scrambling seed;
generate third likelihood information by inverting signs of one of first likelihood information of the first packet or second likelihood information of the second packet based on the inversion data; and
generate fourth likelihood information based on the third likelihood information and the other of the first likelihood information or the second likelihood information.

14. The radio communication apparatus of claim 13, wherein
the baseband integrated circuit is configured to request transmission of the second packet data when a decoded result of the first likelihood information comprises an error.

15. The radio communication apparatus of claim 13, wherein
the first packet data comprises data resulting from scrambling transmitted data by a first scrambling circuit, wherein the first scrambling seed is set to the first scrambling circuit; and
the second packet data comprises data resulting from scrambling transmitted data by the first scrambling circuit, wherein the second scrambling seed is set to the first scrambling circuit.

16. The radio communication apparatus of claim 13, wherein
the baseband integrated circuit is configured to add the third likelihood information to the other of the first likelihood information or the second likelihood information.

17. The radio communication apparatus of claim 13, wherein
the baseband integrated circuit is configured to select one of the third likelihood information and the other of the first likelihood information or the second likelihood information.

18. The radio communication apparatus of claim 13, wherein
the baseband integrated circuit is further configured to cause a memory to store at least one of the first likelihood information or the second likelihood information.

19. The radio communication apparatus of claim 13, wherein
the baseband integrated circuit is further configured to receive the signal of the first packet data and the signal of the second packet data through a radio frequency integrated circuit, and
the baseband integrated circuit and the radio frequency integrated circuit are integrated into a single integrated circuit.

20. A method comprising:
receiving a signal of first packet data scrambled with a first scrambling seed though an antenna;
receiving a signal of second packet data scrambled with a second scrambling seed though the antenna;
generating inversion data in order to convert the first packet data into first scrambled data scrambled with the second scrambling seed or in order to convert the second packet data into second scrambled data scrambled with the first scrambling seed;
generating third likelihood information by inverting signs of one of first likelihood information of the first packet or second likelihood information of the second packet based on the inversion data; and
generating fourth likelihood information based on the third likelihood information and the other of the first likelihood information or the second likelihood information.

* * * * *